(12) United States Patent
Aiteanu (10) Patent No.: US 12,548,352 B2
(45) Date of Patent: Feb. 10, 2026

(54) METHOD AND MONITORING DEVICE FOR DETERMINING AN EYE STATE OF A PERSON, AND MOTOR VEHICLE EQUIPPED THEREWITH

(71) Applicant: Bayerische Motoren Werke Aktiengesellschaft, Munich (DE)

(72) Inventor: Dorin Aiteanu, Berg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 44 days.

(21) Appl. No.: 18/688,836

(22) PCT Filed: Aug. 30, 2022

(86) PCT No.: PCT/EP2022/073987
§ 371 (c)(1),
(2) Date: Mar. 4, 2024

(87) PCT Pub. No.: WO2023/041316
PCT Pub. Date: Mar. 23, 2023

(65) Prior Publication Data
US 2024/0386729 A1 Nov. 21, 2024

(30) Foreign Application Priority Data
Sep. 15, 2021 (DE) .................... 10 2021 123 849.8

(51) Int. Cl.
*G06V 20/59* (2022.01)
*A61B 5/16* (2006.01)
*A61B 5/18* (2006.01)
*G06V 40/18* (2022.01)

(52) U.S. Cl.
CPC ............ *G06V 20/597* (2022.01); *A61B 5/163* (2017.08); *A61B 5/18* (2013.01); *G06V 40/18* (2022.01)

(58) Field of Classification Search
CPC ...... G06V 20/597; G06V 40/18; A61B 5/163; A61B 5/18
(Continued)

(56) References Cited

U.S. PATENT DOCUMENTS

| | | | |
|---|---|---|---|
| 5,805,720 A | 9/1998 | Suenaga et al. | |
| 6,496,724 B1 * | 12/2002 | Levendowski | A61B 5/7264 |
| | | | 128/920 |

(Continued)

FOREIGN PATENT DOCUMENTS

| | | |
|---|---|---|
| DE | 196 14 975 C2 | 1/2000 |
| DE | 10 2008 007 152 A1 | 10/2008 |
| EP | 3 268 942 B1 | 6/2019 |

OTHER PUBLICATIONS

International Search Report (PCT/ISA/210) issued in PCT Application No. PCT/EP2022/073987 dated Dec. 13, 2022 with English translation (5 pages).

(Continued)

*Primary Examiner* — Naomi J Small
(74) *Attorney, Agent, or Firm* — Crowell & Moring LLP (57) ABSTRACT

A method and a monitoring device determine a binary eye state of a person. In the process, a monotonically decreasing slope with at least one specified minimum height is determined in a time curve of an eyelid gap which is determined in a camera-based manner. A current transition threshold for a change between an open and a closed eye is determined as a specified percentage value of the distance between the average value of a number of starting points of decreasing slopes and an average value of a number of corresponding end points. The eye is detected as being closed if the current eyelid gap is smaller than the current transition threshold. A monotonically increasing slope in the eyelid gap curve which has at least one specified minimum height is deter- (Continued)

mined starting from the last end point. The eye is detected as being open if an end of the current increasing slope has been reached.

10 Claims, 1 Drawing Sheet

(58) Field of Classification Search
USPC .......................................................... 340/576
See application file for complete search history.

(56) References Cited

U.S. PATENT DOCUMENTS

| | | | | |
|---|---|---|---|---|
| 2008/0252745 | A1* | 10/2008 | Nakamura | H04N 23/611 |
| | | | | 348/222.1 |
| 2009/0034801 | A1* | 2/2009 | Hammoud | G06V 40/20 |
| | | | | 382/107 |
| 2013/0010096 | A1* | 1/2013 | S. | G06F 3/013 |
| | | | | 348/78 |
| 2017/0143253 | A1* | 5/2017 | Krenzer | A61B 5/4809 |
| 2017/0345276 | A1* | 11/2017 | Stoltz | G06V 20/597 |
| 2018/0240319 | A1 | 8/2018 | Wulf | |
| 2020/0026938 | A1 | 1/2020 | Nishimura et al. | |

OTHER PUBLICATIONS

German-language Written Opinion (PCT/ISA/237) issued in PCT Application No. PCT/EP2022/073987 dated Dec. 13, 2022 with English translation (10 pages).

German-language Search Report issued in German Application No. 10 2021 123 849.8 dated Jul. 6, 2022 with partial English translation (12 pages).

* cited by examiner

METHOD AND MONITORING DEVICE FOR DETERMINING AN EYE STATE OF A PERSON, AND MOTOR VEHICLE EQUIPPED THEREWITH

BACKGROUND AND SUMMARY

The present invention relates to a method and a monitoring device for monitoring or determining a binary eye state of a person. This therefore means that it is possible to identify or determine whether at least one eye of the person is either open or closed. In this case, lid positions between complete opening and complete closing may also be uniquely assigned accordingly, that is to say defined or determined either as open or as closed.

The person may be, in particular, an operator of a technical device, in particular a driver or vehicle occupant of a vehicle. However, the present invention may also be used or usable in other fields or situations. Attentiveness or fatigue of the person, for example, can generally be determined or assessed on the basis of the determined eye state.

Identifying the attentiveness or fatigue of a motor vehicle driver or or an operator of a technical device or of a system may enable improved safety, for example as a result of measures automatically taken on the basis thereof. In this respect, there are already various approaches but they do not yet enable any optimum accuracy, reliability and robustness when identifying the eye state or eye opening state, in particular when there are interfering factors. For example, US 2020/0 026 938 A1 proposes an apparatus for identifying an occupant state. The apparatus therein comprises a lid opening identification unit for identifying a lid opening of a driver of a vehicle, a maximum value of the lid opening and a minimum value of the lid opening. The apparatus also comprises an eye state determination unit for determining that the eye is in an open state if the lid opening becomes greater than a predefined threshold value. The apparatus also comprises a threshold value resetting unit for resetting the threshold value to a value between the maximum value and the minimum value of the lid opening if the maximum value has not become greater than the threshold value for a predefined time or if the minimum value has not become less than the threshold value for a predefined time. However, this may be susceptible to errors, in particular in relation to changes or variations in a viewing direction of the driver in the vehicle vertical direction or in relation to intensity fluctuations of a lighting system.

As a further approach, DE 196 14 975 C2 describes a facial image processing system. An evaluation function calculation apparatus for calculating an evaluation function and an apparatus for assessing the open or closed state of an eye in order to assess, on the basis of the evaluation function, whether the eye is open or closed are provided therein. The evaluation function calculation apparatus calculates, on the one hand, a form function which represents the curvature of the eye in an associated local region and, on the other hand, the evaluation function on the basis of this form function. This is intended to enable accurate eye capture.

As a further approach, EP 3 268 942 B1 describes a method for identifying a fatigue and/or sleeping state of a driver of a vehicle. In this case, a first and a second eye opening signal, each representing a degree of eye opening or a signal derived therefrom for one of the two eyes of the driver, are read in. The eye opening signals are identified as valid if they correspond to a respective criterion. The fatigue and/or sleeping state of the driver is then determined using the first eye opening signal identified as valid and the second eye opening signal identified as valid.

The object of the present invention is to make it possible to determine an eye state of a person in a particularly robust manner.

This object is achieved, according to the invention, by the subjects of the independent patent claims. Possible configurations and developments of the present invention are disclosed in the dependent patent claims, in the description and in the figures.

As stated at the outset, the method according to the invention is used to determine a binary eye state of a person and comprises a plurality of method steps which can be carried out automatically or semi-automatically, in particular. In one method step of the method according to the invention, camera data representing the respective person are captured by means of a camera. This may signify or involve, for example, an image sequence or a video stream being recorded continuously or at a predefined frequency or frame or refresh rate. The capture of the camera data in the present sense may also signify or involve the camera data, that is to say a corresponding image sequence or a corresponding video stream or the like, being retrieved or received from a data memory or via a data interface, for example by a monitoring device configured to carry out the method. A temporal progression of a lid spacing of the person, that is to say a spacing between a lower eyelid and the associated upper eyelid of the person, is determined on the basis of the camera data. In other words, the lid spacing, that is to say an eye opening width of the person, is thus respectively determined for different recording times in the camera data or on the basis of the camera data, for example by means of automatic image processing, object or feature recognition or the like.

In a further method step of the method according to the invention, a monotonously falling edge, which corresponds to closing of the eyes and has at least a predefined minimum height, and its end point, from or at which the lid spacing increases again for the first time since the beginning of the respective falling edge, are determined in the temporal progression of the lid spacing, that is to say are in each case identified or determined if present. The fact that the falling edge has or reaches at least the minimum height may signify, in particular, that the lid spacing decreases along or over the course of the falling edge at least by a predefined amount or a predefined degree. In a graph or diagram in which the time is plotted on an X axis and the lid spacing is plotted on the Y axis, the minimum height can therefore be interpreted as the minimum change in the Y direction. The minimum height predefined for the falling edge may also be referred to as med ("minimal closing distance"). For example, the predefined minimum height may be 5 mm. This value may be experimentally determined and/or modeled, for example, or determined by means of adaptation to recorded data, with the result that other values are also possible depending on the application.

In a further method step of the method according to the invention, a current transition threshold value is dynamically determined in each case and indicates from or for which lid spacing there is a change between an open eye and a closed eye, that is to say an open and a closed eye state, or a change takes place. The transition threshold value is determined as a predefined proportional value of a distance from an average value of a plurality of end points of preceding falling edges to an average value of a plurality of starting points of preceding falling edges or of the plurality of preceding falling edges. In other words, the transition threshold value can therefore be determined as the sum of the average value of the plurality of end points and a predefined part of the difference between this average value and the average value of the plurality of starting points. The average values may be, in particular, sliding average values, that is to say average values determined over a sliding time or data window extending in each case from the current point in time into the past in a predefined manner. The plurality of preceding falling edges may be or comprise falling edges which have occurred or been identified during the respective current operating time or use of the method.

In order to determine the transition threshold value, a corresponding percentage or a percentage constant p may therefore be predefined. The lid spacing must then have reached at least a corresponding proportion or percentage value on the way from the average value of the end points to the average value of the starting points. The transition threshold value toc ("transition open closed") may therefore be expressed as $toc=a_0+p*(a_1-a_0)$, where $a_0$ is the average value of the end points, $a_1$ is the average value of the starting points and p is the predefined proportional value. The proportional value p may be predefined, for example, as p=0.3 or p=30%, but other values are likewise possible in order to adapt the method to different situations, conditions or requirements.

The transition threshold value may be newly determined or newly calculated dynamically, for example for each or after each newly identified falling edge which has at least the predefined minimum height. The average values may be newly determined, calculated or adapted for or with each newly determined lid spacing, for example. Therefore, both the transition threshold value and the average values may change dynamically during the continuous use of the method or during continuous operation of the monitoring device configured to carry out the method. This makes it possible to automatically react to a change in a situation, external circumstances or conditions and/or behaviors or states of the person, without these changes having to be explicitly identified or modeled. For example, increasing fatigue or increased frontal solar radiation may result in a reduction in the average value of the starting points.

In a further method step of the method according to the invention, the respective eye is identified as closed if or as soon as the current lid spacing is less than the current, that is to say last determined, transition threshold value, in particular in each case from the point in time from which this is the case. A corresponding eye state can therefore then be output or set as "closed".

In a further method step, a next monotonously rising edge, which corresponds to opening of the respective eye of the person and has at least a minimum height, is respectively determined from the respective last, that is to say last determined, end point of the or a falling edge in the progression of the lid spacing. In a similar manner to the falling edge, the monotonously rising edge may therefore be a section of the progression of the lid spacing in which the lid spacing becomes greater or remains the same, but at least an increase in the lid spacing corresponding to the predefined minimum height must arise over the course of or along the rising edge. The minimum height predefined for the rising edge may also be referred to as mod ("minimal opening distance"). For example, the minimum height mod may be predefined for the rising edge as mod=4 mm. Other values may likewise be predefined in order to adapt the method or its parameters in a manner appropriate to the situation or requirements. The respective last determined end point, that is to say the end point of the respective last identified falling edge which has at least the minimum height predefined therefor, or points temporally thereafter, that is to say determined later, in the progression of the lid spacing may be taken into account as possible starting points of the or a monotonously rising edge. For example, the rising edge may start at a point in time after the last end point if there is or has been a fluctuation in the lid spacing from the last end point that does not reach the minimum height predefined for the rising edge, that is to say a lid spacing change.

In a further method step of the method according to the invention, the respective eye of the person is identified as open if or as soon as an end of the rising edge, from which the lid spacing decreases again for the first time since the beginning of the respective rising edge, has been identified or reached. A corresponding eye state can therefore then be output or set as "open". The eye state can respectively remain set as "closed" until this point in time. This may be the case, in particular, irrespective of the current, that is to say respective last determined, transition threshold value, that is to say irrespective of whether the current lid spacing is or was temporarily or permanently greater or less than the current transition threshold value.

The present invention is based on the knowledge that improved robustness in comparison with conventional methods with regard to a multiplicity of interference factors can be achieved by dynamically determining or identifying the transitions, that is to say the changes of the eye state from open or opened to closed and vice versa. The method according to the invention can therefore make it possible to determine or monitor the eye state with sufficient accuracy, reliability and robustness in order to be used, for example, for a corresponding driving assistance system of a motor vehicle or the like. The method according to the invention can therefore make it possible to identify or determine the eye state in a robust manner in relation to a changed viewing direction or head movements of the person, in particular in the vehicle vertical direction, in relation to changes in a lighting system, in relation to different eye or lid shapes or lid arrangements, for example between different ethnic groups, in relation to a wink and/or the like. The method according to the invention is likewise advantageously not dependent on recognition and interpretation of a facial expression of the respective person, which, in previous methods, can likewise result in a lack of accuracy, reliability or robustness, for example on account of an error-prone interpretation.

In one possible configuration of the present invention, the respective last, that is to say most recent, point in the temporal progression of the lid spacing, from which the first derivative of the temporal progression of the lid spacing only assumes values of less than or equal to zero until the respective current point in time or until reaching the end point of the respective falling edge, is respectively determined as the possible starting point of a or the falling edge. In other words, the condition that the falling edge should be as long or as large as possible and the lid spacing, that is to say the eye opening, only falls or remains constant, but does not increase, along or during the falling edge is therefore predefined or evaluated here. This is a possibility for determining the falling edge in the temporal progression of the lid spacing that is particularly simple to implement. As soon as the first derivative assumes a value above zero, the last previous point, that is to say the last point at which a value of less than or equal to zero was respectively determined for the first derivative, can be determined or identified as the end point of the respective falling edge. On the basis of this, the height of the respective falling edge can then be determined and compared with the predefined minimum height. If the height of the respective falling edge is less than the predefined minimum height, this falling edge can be deemed to be insignificant or invalid for a change of the eye state and can therefore be rejected. The next point can then be checked as the next possible starting point of a falling edge. In this case, only points after the respective last determined possible end point of a falling edge can be taken into account, in particular. This may make it possible to determine falling edges in the temporal progression of the lid spacing in a particularly efficient manner.

In one possible development of the present invention, the possible starting point of a falling edge is validated and used further as such if the falling edge beginning there reaches at least the predefined minimum height, and is otherwise rejected, that is to say if the lid spacing increases again before the minimum height is reached. The search for the respective next possible starting point of a falling edge can then be resumed and the determination and validation or rejection can respectively be carried out or continued for the next possible starting point that comes into question. As a result of the validation of the starting point proposed here, that is to say ultimately the comparison of the actual height of the respective falling edge with the minimum height predefined for this, unclear or insignificant lid movements can be filtered out. This makes it possible to achieve or ensure that the method according to the invention always provides robustly reliable statements on the eye state. Rejecting possible starting points in the case of accordingly lower actual edge heights advantageously makes it possible to reduce or limit an amount of data processing effort and therefore ultimately to carry out the method in a particularly efficient manner.

In a further possible configuration of the present invention, the average values are each determined from the corresponding n last points or from the corresponding points of the respective last m seconds of the temporal progression of the lid spacing, where n and m are predefined numbers. In other words, in order to determine the respective current average value of the starting points, the n last starting points or the starting points determined in the last m seconds or their values are therefore used, that is to say averaged. Similarly, in order to determine the respective current average value of the end points, the n last end points or the end points determined in the last m seconds or their values are used, that is to say averaged. In other words, the sliding window mentioned for determining the average values may therefore be defined temporally or by a predefined number of points. In this case, only starting or end points of valid falling edges, that is to say those falling edges whose size or height corresponds at least to the predefined falling minimum height, that is to say for which a difference between the lid spacing at their starting point and the lid spacing at their end point corresponds at least to the predefined falling minimum height, can be used or taken into account, in particular. The average values are then not necessarily determined from all measured lid spacings. The determination of the average values over the respective last m seconds may constitute a generally robust and practical possibility for determining the average values. The determination of the average values on the basis of the respective n last corresponding points may make it possible to determine the average values in a particularly reliable and robust manner even in extreme cases, that is to say for example when the person has a particularly low blinking or eye closing frequency. In addition, the use of the respective n last corresponding points may make it possible to consistently determine the average values in different periods and this can respectively be carried out with an amount of data processing effort defined or known in advance, which can possibly enable corresponding hardware and/or software optimization.

In a further possible configuration of the present invention, if a current average value is not available or cannot be determined, a corresponding predefined standard value is used instead. Such a standard value may be, for example, a statistical mean value of a multiplicity of different persons, times and/or situations that is determined in advance. The use of such a predefined standard value may make it possible to use the method according to the invention in a particularly robust manner. The method may also be used, for example, in an error-free manner if no previous data or sufficiently previous data were recorded during the current operating time and/or the most recent available or determinable average values are too old, for example, that is to say are older than a predefined maximum age, for example. Such particularly old average values, that is to say average values determined a long time ago, may possibly be unreliable or no longer relevant or appropriate to the situation since they may have been determined for another person and/or may have arisen under significantly different environmental conditions and/or states of the person, for example.

One possible development of the present invention provides for the respective person to be identified, for example before or at the beginning of the method. If there is already a data set for the respective identified person, a person-specific historical total value of corresponding points, that is to say starting or end points, or average values determined in the past for the identified person, which is stored in this data set, is used as the standard value. This historical total value may include all corresponding points or values determined for the person, or those points or values which were determined in a predefined, in particular sliding, time window, or a predefined number of the points or values last determined for the respective person. The historical total value can then be, for example, a mean value of these points or values that is possibly weighted—for instance with a respective age or a respective confidence of the points or values. As a result, the method can therefore also be carried out in a particularly robust and simultaneously particularly accurate and reliable manner when no current average value is available or can be determined, since the respective standard values are specific to the person, that is to say take into account individual properties of the respective person, for example. This makes it possible to determine the eye state in a particularly accurate, robust and reliable manner. For this purpose, the determined starting or end points or their values and/or the determined average values for the respective identified person can be stored in the respective ongoing method, that is to say during the respective current use or performance of the method, that is to say in the or a corresponding data set, and/or the person-specific historical total value already stored there may be adapted, that is to say updated, on the basis thereof. The present invention can therefore be used in a particularly accurate, reliable and robust manner for different persons, that is to say, for example, when the corresponding vehicle or the corresponding technical device is used or operated by different persons. If there is not yet any data set for an identified person and/or if the respective person cannot be identified, a predefined general standard value can be used.

In a further possible configuration of the present invention, at the beginning of the method and/or after an interruption in the determined or determinable temporal progression of the lid spacing, the eye state is initialized or re-initialized on the basis of a predefined standard threshold value for the lid spacing. Such a standard threshold value may be predefined, for example, as an absolute value or—in particular for the case of an interruption—as a relative value. In the latter case, for example, a percentage or percentage value of the difference between previously or last determined starting and end points may be predefined, for example 0.7 or 70% or the like. The standard threshold value can then correspond to the sum of the lid spacing at the last determined end point and the predefined percentage or percentage value of the difference thereof from the lid spacing at the associated starting point. The or a percentage or percentage value may likewise be predefined, for example, for the lid spacing at the last determined starting point. The standard threshold value can then correspond to the corresponding proportion of the lid spacing at the last starting point. An interruption in the progression of the lid spacing may be caused, for example, by the respective eye or the eyes of the person being temporarily outside a capture or recording region of the camera. This may happen, for example, as a result of an excessive inclination or rotation of the person's head or by the eyes being concealed by an object, a hand or the like. The eye state can then be determined, set and/or output as "open" above this, that is to say when the current spacing is greater than the standard threshold value, and can be determined, set and/or output as "closed" below this, that is to say when the current lid spacing is less than the standard threshold value. This makes it possible to initially carry out or continue the method in a particularly robust and fast manner. In particular, it is possible to avoid the problem of otherwise several minutes being able to elapse, at the beginning of the method or following an interruption in the temporal progression of the lid spacing, before sufficient data are available to carry out the method as described; in this time, the eye state would therefore not be known and a function based thereon could therefore possibly not be carried out.

As described in connection with the average values, the standard threshold value may likewise be determined or adapted in a manner specific to the person. A historical total value, that is to say a value determined on the basis of all data or data available for the respective person for a predefined period or from the last corresponding X data which were determined for the respective person, can therefore be used, for example, where X may be a predefined number or variable. Such a value may be determined, for example, as a mean value of all of the corresponding determined lid spacings which is possibly modified or weighted with a predefined correction or adaptation factor. The historical total value may likewise be determined, for example, as a mean value of the corresponding transition threshold values determined in the past for the respective person. The historical total value can be stored or saved in the corresponding person-specific data set. During the ongoing method, that is to say in the respective current use of the method, this historical total value can then be used as the standard threshold value for initialization at the beginning of the method or for re-initialization following an interruption if the person was identified, that is to say recognized, before or at the beginning of the method and/or following the interruption. This may make it possible to use the method according to the invention in a particularly accurate and reliable manner.

In a further possible configuration of the present invention, an individual eye state is determined for each eye of the person that is represented in the camera data. For the respective person, an open overall eye state is then respectively determined if an open individual eye state was determined for at least one eye. For the respective person, a closed overall eye state is determined if a closed individual eye state was determined for each eye of the person in the capture or recording region of the camera, that is to say for each eye of the person that is represented in the camera data. The overall eye state determined in this manner can then be provided or output for further measures, uses or systems, for example as an output of the monitoring device configured to carry out the method according to the invention. The individual eye states may be determined as described in connection with the other configurations of the method according to the invention. The configuration of the present invention proposed here may make it possible to use the eye state in a particularly reliable and robust manner for further measures or for other systems or devices. The overall eye state may therefore also be determined or output or provided, for example, when the person moves their head such that only one eye, only the other eye or both eyes is/are temporarily or alternately in the capture or recording region of the camera or is/are represented or recognized in the camera data at different points in time. The determination of the open overall eye state that is proposed here can make it possible to filter out or disregard false identifications of closing of the eyes or closing of only precisely one eye of the person that ultimately are not relevant in practice or not relevant to safety. As a result, it is possible to avoid, for example, a corresponding false-positive rate or corresponding ultimately unnecessary or inappropriate automatic performance of measures predefined for a closed eye state. For example, when fully attentive, that is to say without there being safety-relevant fatigue or distraction of the person, the person can deliberately wink with exactly one eye, for example as part of non-verbal communication or the like. In such cases, the attentiveness or alertness of the person is possibly not restricted, with the result that there should also not be any automatic reaction in a corresponding manner.

A further aspect of the present invention is a monitoring device for monitoring or determining an eye state of a person. The monitoring device according to the invention has an input interface for capturing camera data representing the respective person, in particular their eye area, a processor device, that is to say for example a microchip, a microprocessor or a microcontroller, and a computer-readable data memory coupled thereto. The monitoring device according to the invention is configured to carry out, in particular automatically or semi-automatically, at least one variant or embodiment of the method according to the invention. For this purpose, the data memory may save or store a corresponding operating or computer program which codes or implements the corresponding method or its measures, sequences or method steps and can be executed by the processor device in order to carry out the corresponding method or cause it to be carried out. The monitoring device according to the invention may be or correspond to, in particular, the monitoring device mentioned in connection with the method according to the invention. Accordingly, the monitoring device according to the invention may have some or all of the properties and/or features mentioned in connection with the method according to the invention. The monitoring device according to the invention may also have an output interface for outputting a determined eye state or a corresponding data or control signal. The monitoring device according to the invention may likewise have a camera which is coupled to the input interface and is intended to record the camera data.

A further aspect of the present invention is a motor vehicle having a camera and a monitoring device according to the invention. The camera is arranged in or on the motor vehicle and is oriented into a vehicle passenger compartment for the purpose of recording a vehicle occupant. The camera may be a device that is separate from the monitoring device but is connected to its input interface via a data connection or may be a part of the monitoring device. The motor vehicle according to the invention may be, in particular, the motor vehicle mentioned in connection with the method according to the invention. Accordingly, the motor vehicle according to the invention may have some or all of the properties and/or features mentioned in connection with the method according to the invention and/or in connection with the monitoring device according to the invention.

The motor vehicle according to the invention may have, for example, a driver assistance system which can use the eye state determined by the monitoring device as an input or input variable. The eye state or its determination or identification can therefore be used, for example, to activate an emergency stop assistant, that is to say an emergency stop function of the motor vehicle. Such a function requires particularly high reliability and robustness when determining the eye state in order to avoid false tripping, but at the same time in order to be able to react as quickly as possible in serious situations, for example when the person loses consciousness or falls asleep, that is to say to be able to bring the motor vehicle to a standstill or change it to a safe state, for example. The driving assistance system may likewise determine a driver's attentiveness, that is to say a degree of attentiveness or attentiveness state of the respective vehicle occupant, for example on the basis of the determined eye state. In this case, the use of the method according to the invention for determining the eye state makes it possible, for example in comparison with conventional methods, to avoid many false identifications which may conventionally be produced, for instance, by a variation in the viewing direction or by a dazzling effect from oncoming traffic or solar radiation. Driver fatigue, that is to say a fatigue or alertness state of the respective vehicle occupant, can likewise be identified or determined by the driver assistance system on the basis of the determined eye state, for example by means of a PERCLOS algorithm. This is possible all the more accurately, the more accurately, reliably and robustly the points in time at which the eyes are closed can be determined, which is enabled or supported by the use of the method according to the invention.

Further features of the invention may emerge from the claims, the figures and the description of the figures. The features and combinations of features mentioned above in the description and the features and combinations of features shown below in the description of the figures and/or in the figures alone can be used not only in the respectively stated combination, but also in other combinations or alone, without departing from the scope of the invention.

BRIEF DESCRIPTION OF THE DRAWINGS

In the figures, identical and functionally identical elements are provided with the same reference signs.

DETAILED DESCRIPTION OF THE DRAWINGS

Figure 1:
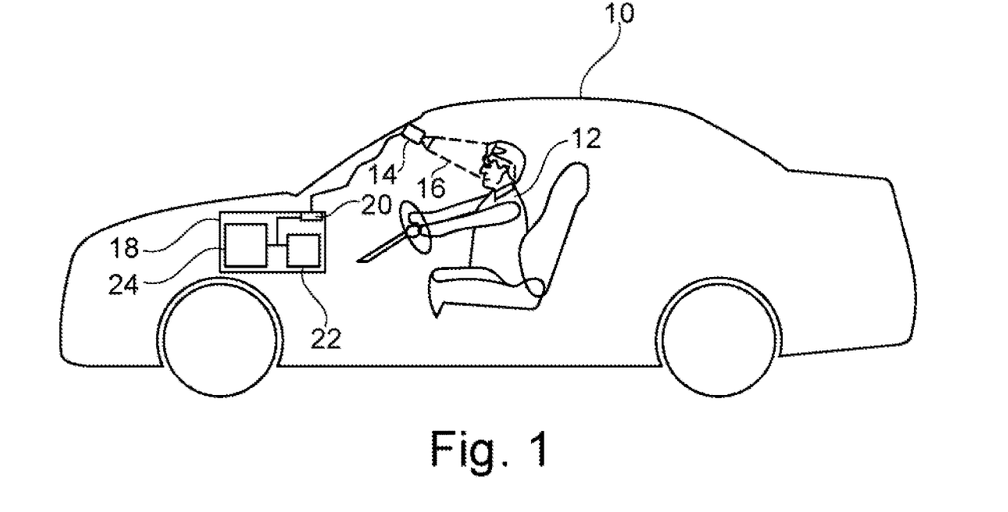
FIG. 1 is a partial schematic illustration of a motor vehicle having a camera and a device for determining an eye state of a vehicle occupant.

FIG. 1 shows a partial schematic side illustration of a motor vehicle 10 which is controlled here by a driver 12. In order to safely control the motor vehicle 10, the driver 12 must not be inattentive or too tired, which can be derived from their eye state, for example. The motor vehicle 10 is configured here to identify or determine this eye state of the driver 12.

For this purpose, the motor vehicle 10 has a camera 14 which is arranged such that its capture or recording region 16 is aligned with the driver 12, in particular an eye area of the driver 12. The motor vehicle 10 also has a corresponding monitoring device 18 which is connected to the camera 14. The monitoring device 18 has an input interface 20 which can be used to capture camera data recorded by the camera 14. The monitoring device 18 also has a processor 22 and a data memory 24. The monitoring device 18 is therefore configured to carry out a predefined method for determining the eye state of the driver 12.

Such a method is explained by way of example below with reference to the figures. In this respect, FIG. 2 and FIG. 3 each show an exemplary schematic diagram illustration, wherein the time is plotted on a respective abscissa axis and a lid spacing a is plotted on a respective ordinate axis.

Figure 2:
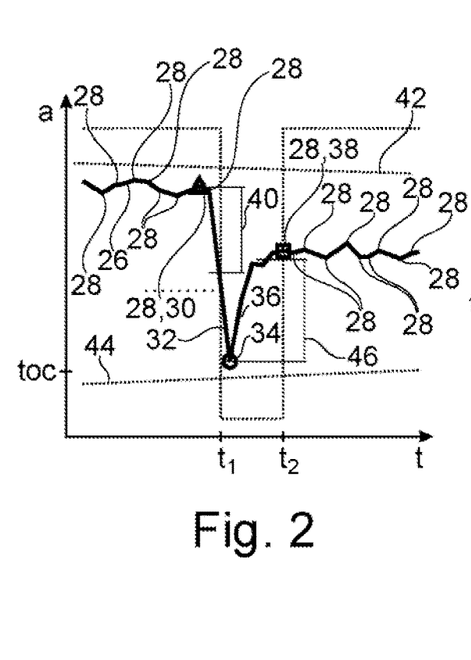
FIG. 2 is a first schematic diagram illustrating the determination of the eye state on the basis of a temporal progression of a lid spacing of the vehicle occupant.
Figure 3:
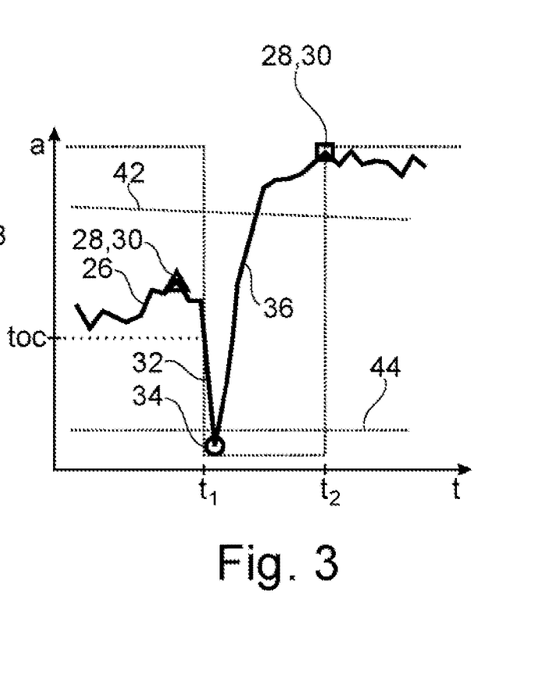
FIG. 3 is a second schematic diagram illustrating the determination of the eye state on the basis of a further temporal progression of a lid spacing of the vehicle occupant.

In the method, the driver 12 is recorded by means of the camera 14. Corresponding camera data are processed or evaluated by the monitoring device 18 in order to determine the instantaneous, that is to say respective current, lid spacing a. This may be carried out continuously or regularly, for example during a driving mode of the motor vehicle 10. The result is therefore a temporal lid spacing progression 26. Examples of such possible temporal lid spacing progressions 26 are illustrated in FIG. 2 and FIG. 3 as corresponding diagram curves. Since eyelids inevitably move continuously, individual points along the lid spacing progression 26, which each represent a specific determination or measurement of the lid spacing a, are connected here in a simplified manner by means of straight lines.

In the lid spacing progressions 26 illustrated, there are in each case initially, up to a first point in time $t_1$, a plurality of open points 28 which show or indicate a lid spacing a corresponding to an open eye, that is to say an open eye state. Since the driver 12 cannot keep his eyes open for an arbitrary time, one of the open points 28 constitutes a starting point 30 of a subsequent monotonously falling edge 32. The lid spacing a decreases monotonously along this falling edge 32. The falling edge 32 ends at an end point 34, from which the lid spacing a increases again. The respective end point 34 is therefore followed by a rising edge 36. This rising edge 36 reaches here to an end 38, from which the lid spacing a decreases again for the first time since a start or beginning of the respective rising edge 36, that is to say from or since the end point 34 here. For example, further open points 28 here follow the respective end 38 of the rising edge 36.

In order to identify a or the falling edge 32, after the first derivative of the line spacing progression 26 has changed from positive to negative at a respective current open point 28, this open point 28 can be considered as a possible starting point 30 of a corresponding edge. As further points or measured values of the lid spacing progression 26 become available, it is then possible to check in each case whether the first derivative of the lid spacing progression 26 has only negative values or zero values from the respective open point 28 under consideration, that is to say the lid spacing a only falls or remains constant. The corresponding open point 28 is then validated as an actual starting point 30 and is used further in the corresponding algorithm if the falling edge 32 beginning there has at least a predefined minimum height or difference of mcd=5 mm, for example, in relation to the lid spacing a at the respective starting point 30. This is represented here by a corresponding falling minimum height 40. It can be seen that the difference in the lid spacing a between the starting point 30 and the end point 34 is greater than the falling minimum height 40. The falling edge 32 is therefore confirmed as such. If the lid spacing a or the lid spacing progression 26 were to increase again instead before reaching the predefined falling minimum height 40 for the starting point 30, the corresponding open point 28 would be rejected as a possible starting point 30 and the respective falling edge 32 would be considered to be an irrelevant or insignificant fluctuation, and the search for an actual starting point 30, at which an accordingly large falling edge 32 starts or begins, would be continued or resumed.

Since the falling edge 32 is greater or higher than the falling minimum height 40 in the present case, the search for the end point 34 of this falling edge 32 is started. For this purpose, a point in the lid spacing progression 26, from which the lid spacing a or the lid spacing progression 26 increases again for the first time since the beginning of the falling edge 32, that is to say from its starting point 30, is determined as the end point 34 of the falling edge 32. The end point 34 is therefore in each case a local minimum of the lid spacing progression 26.

A dynamic threshold of a corresponding transition is used here for the change of the eye state. For this purpose, a respective current transition threshold value toc, which is indicated here by way of example, is calculated or determined. For this purpose, a predefined number of the last identified starting points 30 of preceding falling edges 32 is averaged in order to determine an upper average 42 and a predefined number of the corresponding last identified end points 34 of the preceding falling edges 32 is averaged in order to determine a lower average 44 of the lid spacing a. Current values of the upper average 42 and of the lower average 44 are indicated here purely schematically and by way of example in each case. The fact that these are above and/or below the illustrated points of the lid spacing progression 26, for example, is caused by the fact that the lid spacing progression 26 was accordingly larger or smaller than the points illustrated here, that is to say the section of the temporal lid spacing progression 26 illustrated here, at earlier points in time that are not illustrated here. Alternatively, the starting points 30 identified in a predefined time window extending from the current point in time into the past or the end points 34 identified therein can be averaged in order to determine the current upper average 42 and/or the current lower average 44.

The transition threshold value toc is then calculated by means of a predefined percentage constant p, with the result that it is between the upper average 42 and the lower average 44, for example according to "lower average 44"+p*("upper average 42"−"lower average 44").

A transition of the eye state from open to closed is identified when the current starting point 30 has been validated as such, that is to say the predefined falling minimum height 40 has been reached or exceeded by the current falling edge 32 and the current lid spacing a falls below the transition threshold value toc, which is the case here at the point in time $t_1$. After this point in time or the following next point for which the lid spacing a was determined as being below the transition threshold value toc, the eye state is then determined or output as "closed".

The subsequent rising edge 36 in each case is then identified. The end point 34 of the preceding falling edge 32 is used or considered as a first possible starting point or beginning of the rising edge 36. That point of the lid spacing progression 26 which is the last point in the lid spacing progression 26 before the lid spacing a falls for the first time since the beginning of the respective current rising edge 36, that is to say since the end point 34 here, is identified as the end 38 of the rising edge 36. In this case, it is also necessary to meet the condition that a size or height of the rising edge 36 reaches at least a predefined rising minimum height 46. This rising minimum height 46 may be predefined, for example, as mod=4 mm in relation to the beginning of the respective rising edge 36, that is to say in relation to the end point 34, for example. If the lid spacing a already begins to fall again before the rising minimum height 46 is reached, the respective beginning of a or the rising edge 36 that was considered can be rejected and a new beginning of a or the rising edge 36 can be searched for.

In the present example, a transition of the eye state from closed to open is identified at the point in time at which the end 38 of the current rising edge 36 is identified. That is to say, as soon as a point of the lid spacing progression 26 has been identified as the end 38 of the respective current rising edge 36, the eye state is identified, set or output as "open". This is the case here at or from a second point in time t2.

The falling minimum height 40 and the rising minimum height 46 may be the same or different. Experimentally, it has hitherto been shown that it may be favorable to set or specify the falling minimum height 40 as greater than the rising minimum height 46.

FIG. 3 illustrates a further example of a possible lid spacing progression 26 which may arise for the driver 12, for example, after the lid spacing progression 26 illustrated in FIG. 2. Unlike in the example of the lid spacing progression 26 illustrated in FIG. 2, the lid spacing a is lower before winking by the driver 12, represented by the falling edge 32 and the subsequent rising edge 36, than after winking. This may be due to or caused by a change in a viewing direction or head inclination of the driver 12 in the vehicle vertical direction, for example. In addition, the end point 34 may be at a lower lid spacing a here, with the result that the transition threshold value toc may also be accordingly lower than in the example shown in FIG. 2. This illustrates that the transition threshold value toc is respectively newly determined, that is to say dynamically tracked or adapted, during the method, that is to say over a plurality of transitions of the eye state.

If a head movement of the driver 12, for example, therefore results in identification of the lid spacing a as a result of an interruption in the determined or determinable lid spacing progression 26, the binary eye state may be re-initialized by means of a further predefined constant r as soon as the lid spacing a can be identified or determined again. The constant r may be predefined, for example, as r=0.7 or r=70%, but other values may likewise be possible. During this initialization or re-initialization, the eye state may be determined or output as open for $a > a_0 + r*(a_1 - a_0)$, for example, and otherwise as closed, where $a_0$ can correspond here to the lower average 44 and $a_1$ can correspond to the upper average 42. If no values or no current values for $a_0$ and $a_1$ are available, corresponding predefined standard values can be used, for example $a_0=3$ mm and $a_1=11$ mm or the like. These standard values may be predefined or determined generically or in a person-specific manner for the respective identified driver 12.

Overall, the described examples show how a method and a device for determining the binary eye state of a person can be implemented in a particularly robust manner.

LIST OF REFERENCE SIGNS

10 Motor vehicle
12 Driver
14 Camera
16 Recording region
18 Monitoring device
20 Input interface
22 Processor
24 Data memory
26 Lid spacing progression
28 Open points
30 Starting point
32 Falling edge
34 End point
36 Rising edge
38 End
40 Falling minimum height
42 Upper average
44 Lower average
46 Rising minimum height
a Lid spacing
t Time
t1 First point in time
t2 Second point in time
toc Transition threshold value

What is claimed is:

1. A method for determining a binary eye state of a person, comprising:
    capturing camera data representing the person, via a camera, and determining a temporal progression of a lid spacing between a lower eyelid and an associated upper eyelid of the person based on the camera data;
    determining, in the temporal progression of the lid spacing, a monotonously falling edge, which corresponds to closing of an eye and has at least a predefined minimum height, and its end point, from which the lid spacing increases again for a first time since a beginning of the respective falling edge;
    respectively determining a current transition threshold value which indicates the lid spacing for which a change takes place between an open eye and a closed eye as a sum of an average value of a plurality of end points of preceding falling edges and a predefined proportional value of a difference between said average value and an average value of a plurality of starting points of the preceding falling edges;
    as soon as the current lid spacing falls below the current transition threshold value for the first time along the falling edge, identifying the eye as closed;
    respectively determining a next monotonously rising edge, which corresponds to opening of an eye and has at least a predefined minimum height, from the last end point in each case in the progression of the lid spacing; and
    identifying the eye as open when an end of the rising edge, from which the lid spacing decreases again for the first time since the beginning of the respective rising edge, is reached.

2. The method according to claim 1, wherein
    the respective last point in the temporal progression of the lid spacing, from which the first derivative of the temporal progression of the lid spacing only assumes values of less than or equal to zero until the respective current point in time, is determined as the possible starting point of a falling edge.

3. The method according to claim 2, wherein
    the possible starting point is validated and used further as such when the falling edge beginning there reaches at least the predefined minimum height, and is otherwise rejected.

4. The method according to claim 1, wherein
    the average values are each determined from the corresponding n last points or from the corresponding points of the respective last m seconds of the temporal progression of the lid spacing, where n and m are predefined numbers.

5. The method according to claim 1, wherein
    when a current average value cannot be determined, a corresponding predefined standard value is used instead.

6. The method according to claim 5, wherein
    the respective person is identified and, when there is already a data set for the identified person, a person-specific historical total mean value of corresponding points or average values determined in the past for the identified person, which is stored in the data set, is used as the standard value.

7. The method according to claim 1, wherein
    at the beginning of the method and/or after an interruption in the determined temporal progression of the lid spacing, the eye state is initialized based on a predefined standard threshold value for the lid spacing.

8. The method according to claim 1, wherein
    an individual eye state is determined for each eye of the person that is represented in the camera data and, for the person:
    (i) an open overall eye state is determined when an open individual eye state was determined for at least one eye, and
    (ii) a closed overall eye state is determined when a closed individual eye state was determined for each eye of the person in the recording region of the camera.

9. A monitoring device for determining an eye state of a person, comprising:
    an input interface for capturing camera data representing the respective person;
    a processor and a data memory coupled thereto, wherein the monitoring device is configured to:
    determine a temporal progression of a lid spacing between a lower eyelid and an associated upper eyelid of the person based on the camera data;
    determine, in the temporal progression of the lid spacing, a monotonously falling edge, which corresponds to closing of an eye and has at least a predefined minimum height, and its end point, from which the lid spacing increases again for the first time since the beginning of the respective falling edge;
    respectively determine a current transition threshold value which indicates the lid spacing for which a change takes place between an open eye and a closed eye as a sum of an average value of a plurality of end points of preceding falling edges and a predefined proportional value of a difference between said average value and an average value of a plurality of starting points of the preceding falling edges;

as soon as the current lid spacing falls below the current transition threshold value for the first time along the falling edge, identify the eye as closed;

respectively determine a next monotonously rising edge, which corresponds to opening of an eye and has at least a predefined minimum height, from the last end point in each case in the progression of the lid spacing; and identify the eye as open when an end of the rising edge, from which the lid spacing decreases again for the first time since the beginning of the respective rising edge, is reached.

10. A motor vehicle, comprising:

a camera, which is configured to record a vehicle passenger in a vehicle passenger compartment; and a monitoring device according to claim 9.

\* \* \* \* \*